Patented Dec. 13, 1949

2,491,443

UNITED STATES PATENT OFFICE 2,491,443

COLOR STABILIZATION OF VINYL HALIDE RESINS

Fred W. Cox, Birmingham, Ala., and James M. Wallace, Jr., Akron, Ohio, assignors to Wingfoot Corporation, Akron, Ohio, a corporation of Delaware No Drawing. Application September 18, 1945, Serial No. 617,169

5 Claims. (Cl. 260—45.9)

This invention relates to the stabilization of vinyl halide resins, and particularly the vinyl halide resins which are polymers of at least 70 percent of vinyl halide, including the polymers of 100 percent vinyl halide and the copolymers of vinyl halides with other polymerizable monoolefinic compounds.

Vinyl halide resins generally will discolor when heated, for example at a temperature of 100° C. or higher, especially in the presence of iron or iron salts. It has been discovered that the addition of a small proportion of a nitric acid salt of an organic base to the resin composition will enable the resin to resist the discoloration effect for substantial periods of time.

The vinyl halide resins which may be stabilized in accordance with this invention include the polyvinyl halides, made by the polymerization of any compound of the group consisting of vinyl chloride, vinyl bromide, vinyl fluoride and vinyl iodide without the presence of other polymerizable mono-olefinic compounds. The invention is also useful in the prevention of discoloration upon heating in copolymers of upwards from 70 percent of a vinyl halide with up to 30 percent of another polymerizable mono-olefinic compound. Although any polymerizable mono-olefinic compound which is compatible with the vinyl halide in polymeric form, that is, which forms copolymers therewith, may be stabilized, the invention is particularly useful in the treatment of copolymers of monomeric mixtures of vinyl halide and up to 30 percent of vinyl acetate, vinylidene chloride, styrene, the dialkyl fumarates, the dialkyl maleates, the dialkyl chloromaleates, the dialkyl chlorofumarates, the alkyl acrylates or the alpha substituted alkyl acrylates. The copolymers which are of particular importance are those of 70 to 98 percent of vinyl halide and from 2 to 30 percent of said other mono-olefinic monomer. A preferred class of copolymers are those of 80 to 95 percent of vinyl halide and from 5 to 20 percent of the other monomer.

The stabilization against discoloration upon heating is effected by the addition of a nitric acid salt of any organic base. Suitable bases which may be used to prepare the nitric acid salts are ammonia, aniline, methylamine, dimethylamine, ethylene diamine, dimethyl phenylamine, urea, morpholine, guanidine, and homologues of these compounds and other aliphatic, aromatic and araliphatic amines which may be primary, secondary or tertiary and may be mono-amines or polyamines. The amines which have nitrogen in a heterocyclic ring are also included. In all of these salts at least one pentavalent nitrogen atom is present to which is attached at least one hydrogen atom and a nitrate radical. The compounds may be represented by the following structural formula

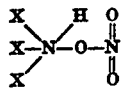

wherein X may be hydrogen or any organic radical. Where the amines from which the stabilizers are derived have a plurality of amino groups one or more molecules of nitric acid may be combined therewith.

The quantity of stabilizer used will depend upon the severity of the heating to which the vinyl resin is to be subjected. Even traces of the agent will yield an improved product which will be useful where only mild heating is to be encountered. Although from 0.05 to 10 percent by weight based on the resin content of the resin will produce useful compositions, generally it is desirable to use from 0.5 to 5 percent of the nitric acid salts of the organic base.

The stabilizing agent may be incorporated by any of several methods. It may be added to the solid resin and mixed therein by means of a roll mill or other mixing machine adapted to blend solid plastic materials. The mixing machine may be heated during the mixing operation to render the compositions more plastic. Alternatively, the stabilizing agent may be dissolved in any suitable solvent, and the solution then mixed with the resin. The vinyl halide resin may be dissolved in a solvent, such as ethylene dichloride, and the stabilizing agent added to the solution and dispersed therein by means of any stirring device. If the polymers or copolymers are prepared by polymerization in an aqueous emulsion, the stabilizing agent may be added and distributed through the polymer prior to coagulation. Any other method which permits a uniform distribution of the stabilizing agent throughout the polymer may be used.

The stabilized resins may be used in the preparation of cast films or in the fabrication of molded or extruded shapes, which uses are well known to the art. The stabilized vinyl halide resins are particularly useful in the preparation of transparent or light colored articles in which discoloration upon heating is undesirable.

Further details of the invention are set forth with respect to the following specific examples:

Example 1

Each of three 10 gram samples of a copolymer of 90 percent vinyl chloride and 10 percent diethyl fumarate were milled with 2 ml. of dibutyl sebacate. Two of these samples were milled respectively with 0.2 grams of ammonium nitrate and with 0.2 grams of methyl guanidine nitrate. The third sample was used as a control for the purpose of comparison. The copolymer samples were milled separately on a laboratory-size chromium-plated roll mill for 5 minutes at 145° F. and then for 5 minutes at 212° F. The copolymers were milled into sheets 1 mm. in thickness and specimens were cut from each. The specimens were tested by heating at 135° C. for 4 hours. The samples containing ammonium nitrate were unaffected by the temperature while the unstabilized film was badly discolored.

Example 2

Using the procedure defined in Example 1 the stabilizing effects of urea and urea nitrate were determined. It was found that after 4 hours of heating the copolymer containing urea nitrate was not discolored while the specimen containing urea and the control specimen were about equally discolored.

This application is a continuation in part of application Serial No. 502,307 filed September 14, 1943, now abandoned.

Although the invention has been described with respect to specific examples it is not intended that the details thereof shall be construed as limitations upon the scope of the invention except to the extent incorporated in the following claims.

We claim:

1. A vinyl halide resin capable of resisting discoloration upon heating which comprises a polymer of the group consisting of polyvinyl halide and the copolymers of upwards from 70% of vinyl halide and up to 30% of another polymerizable mono-olefinic compound, said polymer containing from 0.05 to 10% by weight, based on the polymer content, of a nitrate selected from the group consisting of ammonium nitrate, methyl guanidine nitrate and urea nitrate.

2. A vinyl chloride resin capable of resisting discoloration upon heating which comprises a copolymer of 70 to 98% of vinyl chloride and from 2 to 30% of a dialkyl fumarate, said resin containing from 0.05 to 10% by weight, based on the polymer content, of a nitrate selected from the group consisting of ammonium nitrate, methyl guanidine nitrate and urea nitrate.

3. A vinyl chloride resin capable of resisting discoloration upon heating which comprises a copolymer of 70 to 98% of vinyl chloride and from 2 to 30% of diethyl fumarate, said resin containing from 0.05 to 10% by weight, based on the polymer content, a nitrate selected from the group consisting of ammonium nitrate, methyl guanidine nitrate and urea nitrate.

4. A vinyl chloride resin capable of resisting discoloration upon heating which comprises a copolymer of 70 to 98% of vinyl chloride and from 2 to 30% of a dialkyl maleate, said resin containing from 0.05 to 10% by weight, based on the polymer content, of a nitrate selected from the group consisting of ammonium nitrate, methyl guanidine nitrate and urea nitrate.

5. A vinyl chloride resin capable of resisting discoloration upon heating which comprises a copolymer of 90% of vinyl chloride and 10% of diethyl fumarate, said resin containing from 0.05 to 10% by weight, based on the polymer content, a nitrate selected from the group consisting of ammonium nitrate, methyl guanidine nitrate and urea nitrate.

FRED W. COX.
JAMES M. WALLACE, Jr.

REFERENCES CITED

The following references are of record in the file of this patent:

UNITED STATES PATENTS

| Number | Name | Date |
|---|---|---|
| 1,932,889 | Groff | Oct. 31, 1933 |
| 2,103,581 | Gray | Dec. 28, 1937 |
| 2,190,776 | Ellingboe et al. | Feb. 20, 1940 |

OTHER REFERENCES

Karrer, Organic Chemistry, pages 125–126, published by Elsevier, New York 1938.